No. 873,709. PATENTED DEC. 17, 1907.
B. BESKOW.
TRACTION-VARYING DEVICE.
APPLICATION FILED OCT. 2, 1906.

Attest:
C. S. Middleton
Edward N. Sarton

Inventor
Bernhard Beskow
By Spear, Middleton, Donaldson & Spear
Attys.

UNITED STATES PATENT OFFICE.

BERNHARD BESKOW, OF NEW YORK, N. Y.

TRACTION-VARYING DEVICE.

No. 873,709.  Specification of Letters Patent.  Patented Dec. 17, 1907.

Application filed October 2, 1906. Serial No. 337,111.

*To all whom it may concern:*

Be it known that I, BERNHARD BESKOW, a citizen of the United States, residing at New York city, New York, have invented certain new and useful Improvements in Traction-Varying Devices, of which the following is a specification.

My invention relates to improvements in traction engines or motor vehicles, and the object of the invention is to provide means for varying the tractive power of the motor by varying the downward pressure of the traction wheels by means of the load contained in the trailer.

An embodiment of the invention is shown in the accompanying drawing in which,—

Figure 1:
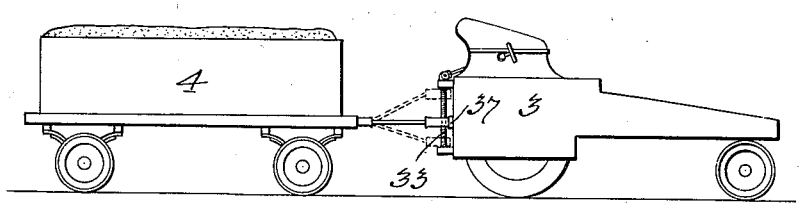
Figure 3:
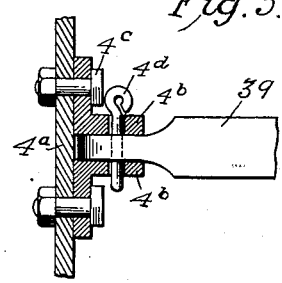
Figure 2:
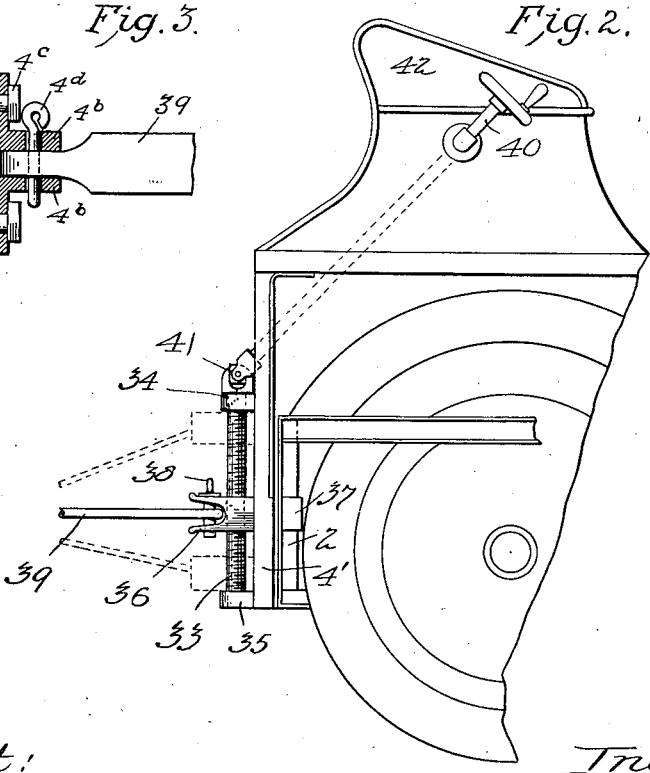

Figure 1 is a side elevation. Fig. 2 is an enlarged detail view. Fig. 3 is a detailed view showing the connection between the rear end of the draw bar and the trailer.

Referring by reference characters to this drawing, the numeral 3 designates a traction engine which is preferably of the form and construction shown in detail in my application filed Oct. 3/05, Serial Number 281169, and 4 a suitable trailer adapted to be drawn by the engine or tractor. The tractor and trailer I connect by a very simple form of connection in such a manner that a portion of the weight of the load of the trailer is transferred to or made effective for increasing the downward pressure of the tractor upon its traction wheels. In the form of such device shown in the drawings, a screw threaded shaft 33 is mounted vertically in bearings 34 and 35 at the rear end of the car, preferably at the top and bottom respectively of the frame 4. A nut 36 is mounted on the shaft so as to be moved up or down when the shaft is rotated. The forward end of the nut is provided with a band or loop 37 which engages with or fits around the rear end of the frame 2, and thereby causes the weight of the load which is connected with the coupling pin 38 by the draw bar 39 to be mostly sustained or carried directly by the main frame of the car.

The rear end of the draw bar may be connected to the trailer by any suitable form of pivotal connection which will allow the draw bar to be swung vertically up and down into positions above and below the horizontal line. A convenient form of pivotal connection is shown in detail in Fig. 3 in which $4^a$ designates a plate forming a part of the front end of the frame of the trailer. Lugs $4^b$ are connected to this in any suitable manner, as for instance, by bolts $4^c$, and receive between them the rear end of the draw bar 39 which is pivotally connected to the lugs by any suitable connection, such for instance as a pin $4^d$ passing through lining openings in lugs and the rear end of the draw bar. With the parts arranged in this manner it is evident, that if the shaft be rotated so as to move the nut upward above the horizontal or line of direct pull, the forward end of the draw bar will be inclined upward and the weight of the load on the trailer will pull down upon the rear of the tractor and thereby add that much to the tractive power of the drive wheels. But if the nut be moved downward the result will be just the opposite, hence the downward movement of the nut is only used in backing the tractor and its load in which the push upon the downwardly inclined draw bar will cause the weight of the forward end of the trailer to be transmitted to the rear end of the tractor and force it down upon the traction wheels. In this manner the effectiveness of my tractor for hauling purposes can be readily increased at any time by simply rotating the screw shaft which can be done by means of a crank shaft 40, one end of which is connected with the shaft by means of a universal joint 41 and the other end is adjacent to the side of the seat 42.

Having thus described my invention what I claim is:—

1. In a tractor, a frame provided with traction wheels, a vertically swinging draw bar for connecting a trailer with said frame, and means for shifting the forward end of the bar either above or below the level of its connection with the trailer.

2. In a tractor, a frame provided with traction wheels, a vertically arranged screw-threaded shaft at the rear of said frame, a nut on the shaft and engaging with the rear end of said frame, a vertically swinging draw bar pivoted to a trailer and having its free end connected with said nut, and means for rotating the shaft to move the nut and the forward end of the draw bar vertically to shift the weight of the trailer to said traction wheels.

In testimony whereof, I affix my signature in presence of two witnesses.

BERNHARD BESKOW.

Witnesses:
ALICE EVELYN WINSLOW,
FANNY L. RICHEY.